(12) United States Patent
Kalinina et al.

(10) Patent No.: US 11,407,918 B2
(45) Date of Patent: Aug. 9, 2022

(54) SURFACE COATING MATERIAL AND FILM AND STACKED STRUCTURE AND DISPLAY DEVICE AND ARTICLE

(71) Applicant: Samsung Electronics Co., Ltd., Suwon-si (KR)

(72) Inventors: Fedosya Kalinina, Hwaseong-si (KR); Byung Ha Park, Yongin-si (KR); Dmitry Androsov, Suwon-si (KR); Feifei Fang, Suwon-si (KR); Sung Hun Hong, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 191 days.

(21) Appl. No.: 16/703,057

(22) Filed: Dec. 4, 2019

(65) Prior Publication Data
US 2020/0291258 A1 Sep. 17, 2020

(30) Foreign Application Priority Data
Mar. 12, 2019 (KR) .......................... 10-2019-0028223

(51) Int. Cl.
| | |
|---|---|
| *C09D 171/02* | (2006.01) |
| *C03C 17/30* | (2006.01) |
| *C09D 183/08* | (2006.01) |
| *C09D 183/12* | (2006.01) |
| *C09D 193/04* | (2006.01) |
| *G02B 1/10* | (2015.01) |
| *C08G 77/18* | (2006.01) |

(Continued)

(52) U.S. Cl.
CPC ............ *C09D 171/02* (2013.01); *C03C 17/28* (2013.01); *C08G 77/18* (2013.01); *C08L 83/04* (2013.01); *C09D 183/08* (2013.01); *C09D 183/12* (2013.01); *C09D 193/04* (2013.01); *G02B 1/10* (2013.01)

(58) Field of Classification Search
None
See application file for complete search history.

(56) References Cited

U.S. PATENT DOCUMENTS

| | | |
|---|---|---|
| 7,285,674 B2 | 10/2007 | Palma et al. |
| 9,249,338 B2 | 2/2016 | Park et al. |

(Continued)

FOREIGN PATENT DOCUMENTS

| | | |
|---|---|---|
| JP | 3151143 B2 | 4/2001 |
| JP | 5636024 B2 | 12/2014 |

(Continued)

*Primary Examiner* — Tae H Yoon
(74) *Attorney, Agent, or Firm* — Harness, Dickey & Pierce, P.L.C.

(57) ABSTRACT

Disclosed are a surface coating material including a compound represented by Chemical Formula 1, a film, a stacked structure, a display device, and an article including a glass substrate coated with the surface coating material.

[Chemical Formula 1]

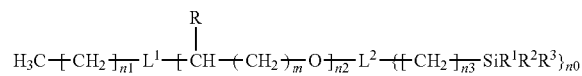

In Chemical Formula 1, each substituent is the same as defined in the detailed description.

8 Claims, 5 Drawing Sheets

(51) Int. Cl.
*C08L 83/04* (2006.01)
*C03C 17/28* (2006.01)

(56) References Cited

U.S. PATENT DOCUMENTS

| | | |
|---|---|---|
| 9,365,755 B2 | 6/2016 | Yano et al. |
| 9,637,644 B2 | 5/2017 | Ham et al. |
| 2017/0158910 A1 | 6/2017 | Ham et al. |
| 2017/0349785 A1 | 12/2017 | Galvez et al. |
| 2018/0298039 A1* | 10/2018 | Satoh ........................ C09D 1/00 |

FOREIGN PATENT DOCUMENTS

| | | |
|---|---|---|
| JP | 5757106 B2 | 7/2015 |
| JP | 5785954 B2 | 9/2015 |
| KR | 20130059544 A | 6/2013 |
| KR | 101719340 B1 | 3/2017 |
| KR | 101800743 B1 | 11/2017 |

\* cited by examiner

SURFACE COATING MATERIAL AND FILM AND STACKED STRUCTURE AND DISPLAY DEVICE AND ARTICLE

CROSS-REFERENCE TO RELATED APPLICATION

This application claims priority to and the benefit of Korean Patent Application No. 10-2019-0028223, filed in the Korean Intellectual Property Office on Mar. 12, 2019, the entire contents of which are incorporated herein by reference.

BACKGROUND

1. Field

A surface coating material, a film, a stacked structure, a display device, and an article are disclosed.

2. Description of Related Art

A portable electronic device, such as a smart phone or a tablet PC, may include a functional layer having various functions. In particular, recently, as a touch screen panel recognizing a contact position using a finger or a tool is universalized, a functional layer may be applied on the surface of a display panel in order to improve a surface slipping property and a sense of touch of a touch screen panel.

However, such a functional layer has weak durability and may be easily lost or destroyed by frequent contact so that its function may be rapidly lost.

SUMMARY

An embodiment provides a surface coating material that is capable of improving durability due to a low friction coefficient.

Another embodiment provides a film that is capable of improving durability.

Another embodiment provides a stacked structure including the film.

Another embodiment provides a display device including the film or the stacked structure.

Another embodiment provides an article coated with the surface coating material.

According to an embodiment, a surface coating material includes a compound represented by Chemical Formula 1.

[Chemical Formula 1]

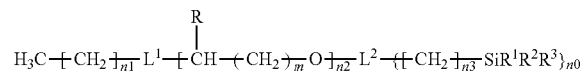

In Chemical Formula 1, $R^1$ to $R^3$ are independently hydrogen, halogen, hydroxyl group, or a substituted or unsubstituted C1 to C20 alkoxy group, R is hydrogen or a substituted or unsubstituted C1 to C20 alkyl group, $L^1$ is a single bond, *—O—*, *—C(=O)O—*, *—NH—$(CH_2)_{p1}$—C(=O)O—*, or *—S—$(CH_2)_{p2}$—*, or *—S—$(CH_2)_{p2}$—O—*

$L^2$ is a single bond, a substituted or unsubstituted C1 to C20 alkylene group, *—C(=O)—*, *—C(=O)NH—*, *—C(=O)$(CH_2)_{p3}$NH—*, *—NHC(=O)NH—*, *—C(=O)$(CH_2)_{p4}$NH$(CH_2)_{p5}$NH—*, *—$(CH_2)_{p6}$S—*, or

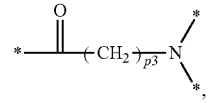

p1 to p6 are independently integers ranging from 1 to 20,
n0 is an integer of 1 or 2,
n1 to n2 are independently integers ranging from 3 to 20,
n3 is an integer ranging from 3 to 23, and
m is an integer ranging from 1 to 5.

In example embodiments, the compound represented by Chemical Formula 1 includes repeating units corresponding to Chemical Formulas 1-1 to 1-3 below. A sum of each weight average molecular weight of the repeating unit represented by Chemical Formula 1-1, the repeating unit represented by Chemical Formula 1-2, and the repeating unit represented by Chemical Formula 1-3 may be in the range of about 380 g/mol to about 1600 g/mol.

[Chemical Formula 1-1]

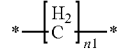

[Chemical Formula 1-2]

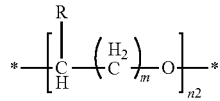

[Chemical Formula 1-3]

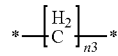

In some embodiments, the weight average molecular weight of the repeating unit represented by Chemical Formula 1-2 may be larger than that of each weight average molecular weight of repeating units represented by Chemical Formula 1-1 and Chemical Formula 1-3.

In some embodiments, the repeating unit represented by Chemical Formula 1-1 may have a weight average molecular weight of about 140 g/mol to about 280 g/mol, the repeating unit represented by Chemical Formula 1-2 may have a weight average molecular weight of about 159 g/mol to about 1188 g/mol, and the repeating unit represented by Chemical Formula 1-3 may have a weight average molecular weight of about 28 g/mol to about 322 g/mol.

According to another embodiment, a film may include a condensation polymerization product of the compound represented by Chemical Formula 1 is provided. Chemical Formula 1 may be the same as described above.

In some embodiments, the film may be a coated film or a deposited film.

In some embodiments, the film may have a water contact angle of about 60° to about 80° and an oil contact angle of less than about 50°.

According to another embodiment, a stacked structure including a substrate and the film is provided.

According to another embodiment, a display device including the film or the stacked structure is provided.

According to another embodiment, an article coated with the surface coating material is provided.

The friction coefficient of the functional layer may be reduced and thus durability of may be improved.

According to another embodiment, a surface coating material may include a compound represented by Chemical Formula 1A.

[Chemical Formula 1A]

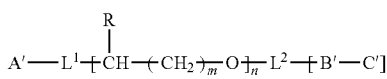

In Chemical Formula 1A,

R is hydrogen or a substituted or unsubstituted C1 to C20 alkyl group, $L^1$ is a single bond, *—O—*, *—C(=O)O—*, *—NH—$(CH_2)_{p1}$—C(=O)O—*, *—S—$(CH_2)_{p2}$—*, or *—S—$(CH_2)_{p2}$—O—*, $L^2$ is a single bond, a substituted or unsubstituted C1 to C20 alkylene group, *—C(=O)—*, *—C(=O)NH—*, *—C(=O)$(CH_2)_{p3}$NH—*, *—NHC(=O)NH—*, *—C(=O)$(CH_2)_{p4}$NH$(CH_2)_{p5}$NH—*, *—$(CH_2)_{p6}$S—*, or

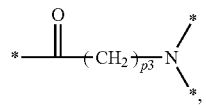

p1 to p6 are independently integers ranging from 1 to 20, n is an integer ranging from 3 to 20, n0 is an integer of 1 or 2, A' is a C4 to C21 alkyl group, B' is a C3 to C23 alkylene group, C' is a hydrolyzable silane moiety, and m is an integer ranging from 1 to 5.

In some embodiments, A' in Chemical Formula 1A may be a group represented by Chemical Formula 1-1A. In Chemical Formula 1-1A, n1 may be an integer ranging from 3 to 20.

[Chemical Formula 1-1A]

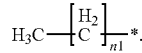

In some embodiments, B' in Chemical Formula 1A may be a repeating unit represented by Chemical Formula 1-3. In Chemical Formula 1-3, n3 may be an integer ranging from 3 to 23.

[Chemical Formula 1-3]

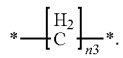

In some embodiments, C' in Chemical Formula 1A may be represented by *—$SiR^1R^2R^3$, and $R^1$ to $R^3$ independently may be hydrogen, halogen, hydroxyl group, or a substituted or unsubstituted C1 to C20 alkoxy group.

In some embodiments, Chemical Formula 1A may include the repeating unit represented by Chemical Formula 1-2. Also, n2 may be in a range from 3 to 20. The weight average molecular weight of the repeating unit represented by Chemical Formula 1-2 may be greater than the weight average molecular weight of the group represented by group B' in Chemical Formula 1A.

[Chemical Formula 1-2]

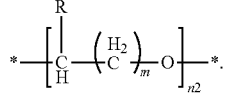

In some embodiments, an article may include a substrate coated with one of the foregoing surface coating materials.

DETAILED DESCRIPTION

Figure 1:
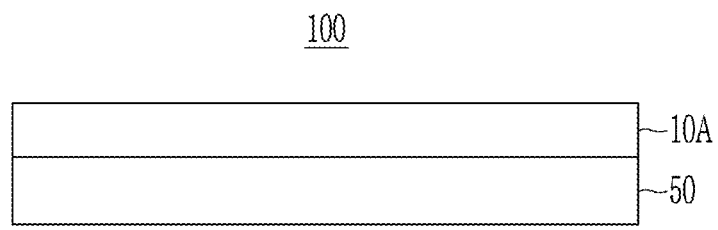
FIG. 1 is a cross-sectional view showing a display device according to an embodiment.

Example embodiments of the present disclosure will hereinafter be described in detail and may be easily performed by a person having an ordinary skill in the related art. However, actually applied structures may be embodied in many different forms, and is not to be construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the drawings, parts having no relationship with the description are omitted for clarity of the embodiments, and the same or similar constituent elements are indicated by the same reference numeral throughout the specification.

As used herein, "an alkylene group" may be an alkanediyl group. An "alkyl group" may be, for example a methyl group, an ethyl group, a propyl group, an isopropyl group, a n-butyl group, an isobutyl group, a t-butyl group, a pentyl group, a hexyl group, and the like.

As used herein, when a definition is not otherwise provided, "substituted" may refer to replacement of a hydrogen atom of a compound by a substituent of a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, or a combination thereof.

As used herein, when a definition is not otherwise provided, "hetero" may refer to one including 1 to 4 heteroatoms of N, O, S, Se, Te, Si, or P.

As used herein, when a specific definition is not otherwise provided, "*" indicates a point where the same or different atom (including a hydrogen atom) or chemical formula is linked.

Hereinafter, "combination" refers to a mixture of two or more and a stack structure of two or more.

Hereinafter, a surface coating material according to an embodiment is described.

The surface coating material according to an embodiment includes a compound represented by Chemical Formula 1.

[Chemical Formula 1]

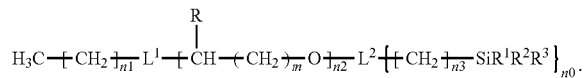

In Chemical Formula 1, $R^1$ to $R^3$ are independently hydrogen, halogen, hydroxyl group, or a substituted or unsubstituted C1 to C20 alkoxy group, R is hydrogen or a substituted or unsubstituted C1 to C20 alkyl group, $L^1$ is a single bond, *—O—*, *—C(=O)O—*, *—NH—(CH$_2$)$_{p1}$—C(=O)O—*, *—S—(CH$_2$)$_{p2}$—*, or *—S—(CH$_2$)$_{p2}$—O—*, $L^2$ is a single bond, a substituted or unsubstituted C1 to C20 alkylene group, *—C(=O)—*, *—C(=O)NH—*, *—C(=O)(CH$_2$)$_{p3}$NH—*, *—NHC(=O)NH—*, *—C(=O)(CH$_2$)$_{p4}$NH(CH$_2$)$_{p6}$NH—*, *—(CH$_2$)$_{p6}$S—*, or

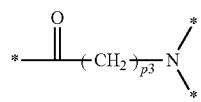

(p1 to p6 are independently integers ranging from 1 to 20), n0 is an integer of 1 or 2, n1 and n2 are independently integers ranging from 3 to 20, n3 is an integer ranging from 3 to 23, and m is an integer ranging from 1 to 5.

Preferably, at least two (e.g., two or three) of $R^1$ to $R^3$ are independently hydrogen, a substituted or unsubstituted C1 to C20 alkoxy group, a halogen, or a hydroxy group, preferably a substituted or unsubstituted C1 to C20 alkoxy group or a halogen.

For example, the p1 to p6 may independently be integers ranging from 2 to 20 or 3 to 20.

Since a composition including a siloxane compound consisting of an alkylene group and an oxyalkylene group has a low friction coefficient and thus excellent fingerprint resistance, plenty of attempts to use this composition as a surface coating material have been made, but a display treated with this conventional surface coating material look worn out compared with the initial display surface after about three months due to weak durability, even when examined with naked eyes.

Accordingly, an attempt to reinforce the durability by using a composition using a perfluoropolyethersilane compound instead of the siloxane compound as a surface coating material has been made. However, herein, the durability is reinforced, but there is a problem of greatly deteriorating fingerprint resistance such as a diffused reflection due to a smudged fingerprint on the surface coating material and the like.

However, the surface coating material according to an embodiment includes the compound represented by Chemical Formula 1 and thus may show excellent fingerprint resistance and simultaneously, remarkably improved durability.

Specifically, the compound represented by Chemical Formula 1 has a ternary copolymer (a copolymer of three repeating units respectively having the numbers of repeating units represented by n1, n2, and n3) backbone and a linear type in which the repeating units having the numbers of repeating units respectively represented by n1 and n3 are an alkylene group, the repeating unit having the number of repeating unit represented by n2 is a polyoxyalkylene group, and a silane group (a hydrolyzable silane moiety) is included at one terminal end, and thus is disposed in a form of a long chain having a large molecular weight on a substrate which is subjected to be surface-coated. Herein, since the chain is long, the chain (the repeating unit having the number of repeating unit represented by n1; the alkylene group) at the farther side from the substrate lies down parallel to the substrate and thus provides a so-called brush effect. Accordingly, a friction coefficient is reduced, and ultimately, durability of the substrate coated with the surface coating material according to an embodiment may be remarkably improved. This effect is realized due to a structure of the compound represented by Chemical Formula 1 having the ternary copolymer backbone consisting of an alkylene group-a polyoxyalkylene group-an alkylene group. For example, a compound having a binary copolymer backbone may hardly provide the brush effect and the like, and even if provided, the brush effect is very insignificant.

For example, in the compound represented by Chemical Formula 1, a sum of each weight average molecular weight of a repeating unit represented by Chemical Formula 1-1 (the repeating unit having the number of repeating unit represented by n1; the alkylene group), a repeating unit represented by Chemical Formula 1-2 (the repeating unit having the number of repeating unit represented by n2; the polyoxyalkylene group), and a repeating unit represented by Chemical Formula 1-3 (the repeating unit having the number of repeating unit represented by n3; the alkylene group) may be in a range of about 380 g/mol to about 1600 g/mol. When the sum of each weight average molecular weight of the three repeating units is within the range, durability of the surface coating material including this compound may be further improved.

[Chemical Formula 1-1]

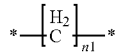

[Chemical Formula 1-2]

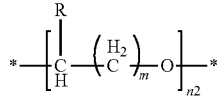

-continued

[Chemical Formula 1-3]

$$*\text{---}\left[\underset{}{\overset{H_2}{C}}\right]_{n3}\text{---}*$$

When the sum of each weight average molecular weight of the three repeating units is less than about 380 g/mol, the chain is not so long enough to provide the brush effect, and accordingly, durability may not be improved according to deterioration of a friction coefficient, while when the sum of each weight average molecular weight of the repeating units is greater than about 1600 g/mol, the compound of the ternary copolymer backbone represented by Chemical Formula 1 may hardly be synthesized.

For example, a weight average molecular weight of the repeating unit represented by Chemical Formula 1-2 may be larger than each weight average molecular weight of repeating units represented by Chemical Formula 1-1 and Chemical Formula 1-3. When the repeating unit represented by Chemical Formula 1-2 among the three repeating units has a smaller weight average molecular weight than the other two repeating units, the chain at the farther side from the substrate, the alkylene group, may easily lie down parallel to the substrate and thus much improve durability.

For example, the repeating unit represented by Chemical Formula 1-1 may have a weight average molecular weight of about 140 g/mol to about 280 g/mol, the repeating unit represented by Chemical Formula 1-2 may have a weight average molecular weight of about 159 g/mol to about 1188 g/mol, for example 330 g/mol to 1188 g/mol, and the repeating unit represented by Chemical Formula 1-3 may have a weight average molecular weight of about 28 g/mol to about 322 g/mol.

The compound represented by Chemical Formula 1 has an alkyl group and a hydrolyzable silane moiety at each terminal end and accordingly, due to a surface energy difference at both of the terminal ends, may be aligned in one direction, for example, in a perpendicular direction with the substrate coated with the surface coating material.

The hydrolyzable silane moiety may be a silanyl group substituted with at least one hydrolyzable functional group, for example a silanyl group substituted with at least one substituted or unsubstituted C1 to C20 alkoxy group, a substituted or unsubstituted C1 to C20 alkyl group, a halogen, or a hydroxy group. The hydrolyzable silane moiety may be bound to a substrate or a lower layer by a hydrolysis and/or condensation polymerization reaction during a coating or depositing process.

The repeating unit represented by Chemical Formula 1-2 among three repeating units comprising the ternary copolymer may form a non-covalent interaction with adjacent molecules. The non-covalent interaction is not a covalent bond and may be for example a hydrogen bond. In addition, in Chemical Formula 1, linking groups represented by $L^1$ and $L^2$ also may form the non-covalent interaction with adjacent molecules, for example, the hydrogen bond and the like (however, except that $L^1$ may be a single bond and $L^2$ may be an alkylene group).

For example, in Chemical Formula 1, $R^1$ to $R^3$ may independently be a substituted or unsubstituted C1 to C20 alkoxy group, $L^1$ may be *—C(=O)O—*, *—NH—(CH$_2$)p1-C(=O)O—*, *—S—(CH$_2$)p2-*, or *—S—(CH$_2$)p2-O—*, and $L^2$ may be a substituted or unsubstituted C1 to C20 alkylene group, *—C(=O)—*, *—C(=O)NH—*, C(=O)(CH$_2$)p3NH—*, *—NHC(=O)NH—*, *—C(=O) (CH$_2$)p4NH(CH$_2$)p5NH—*, or (CH$_2$)p6S-*, and p1 to p6 are independently integers ranging from 1 to 10, or 2 to 10 or 3 to 10.

In an embodiment, the surface coating material may include a compound represented by Chemical Formula 1A,

[Chemical Formula 1A]

$$A'\text{---}L^1\text{---}\!\!\left[\!\!\underset{}{\overset{R}{CH}}\text{---}(CH_2)_m\text{---}O\right]_{\!n}\!\!\text{---}L^2\text{---}\!\left[B'\text{---}C'\right]_{n0}$$

In Chemical Formula 1A,

R is hydrogen or a substituted or unsubstituted C1 to C20 alkyl group, $L^1$ is a single bond, *—O—*, *—C(=O)O—*, *—NH—(CH$_2$)$_{p1}$—C(=O)O—*, *—S—(CH$_2$)$_{p2}$—*, or *—S—(CH$_2$)p2-O—*, $L^2$ is a single bond, a substituted or unsubstituted C1 to C20 alkylene group, *—C(=O)—*, *—C(=O)NH—*, *—C(=O)(CH$_2$)$_{p3}$NH—*, *—NHC(=O)NH—*, *—C(=O)(CH$_2$)$_{p4}$NH(CH$_2$)$_{p5}$NH—*, *—(CH$_2$)$_{p6}$S—*, or $$*\text{---}\underset{}{\overset{O}{\|}}\text{---}(CH_2)_{\overline{p3}}\text{---}N\overset{*}{\underset{*,}{\diagdown}}$$

p1 to p6 are independently integers ranging from 1 to 20,
n is an independently integers ranging from 3 to 20, n0 is an integer of 1 or 2,
A' is a C4 to C21 alkyl group,
B' is a C3 to C23 alkylene group,
C' is a hydrolyzable silane moiety, and
m is an integer ranging from 1 to 5.
A' in Chemical Formula 1 A is a group represented by Chemical Formula 1-1A.

[Chemical Formula 1-1A]

$$H_3C\text{---}\left[\underset{}{\overset{H_2}{C}}\right]_{n1}\!\!\text{---}*.$$

In Chemical Formula 1-1A, n1 is an integer ranging from 3 to 20.

B' in Chemical Formula 1A may be a repeating unit represented by Chemical Formula 1-3 discussed above.

C' in Chemical Formula 1A may be represented by *—SIR$^1$R$^2$R$^3$, wherein $R^1$ to $R^3$ may independently be hydrogen, halogen, hydroxyl group, or a substituted or unsubstituted C1 to C20 alkoxy group.

Chemical Formula 1A may include the repeating unit represented by Chemical Formula 1-2. The weight average molecular weight of the repeating unit represented by Chemical Formula 1-2 may be greater than the weight average molecular weight of the group represented by group B' in Chemical Formula 1A.

According to another embodiment, a film including a condensation polymerization product of the compound represented by Chemical Formula 1 or 1A is provided.

In the condensation polymerization product of the compound represented by Chemical Formula 1, a sum of each weight average molecular weight of a repeating unit represented by Chemical Formula 1-1, a repeating unit represented by Chemical Formula 1-2, and a repeating unit represented by Chemical Formula 1-3 may be in the range of about 380 g/mol to about 1600 g/mol. As aforementioned, when the sum of each weight average molecular weight of the three repeating units is within the range, durability of the surface coating material may be further improved.

For example, in the condensation polymerization product, a weight average molecular weight of the repeating unit represented by Chemical Formula 1-2 may be larger than each weight average molecular weight of repeating units represented by Chemical Formula 1-1 and Chemical Formula 1-3. Among the three repeating units, the repeating unit represented by Chemical Formula 1-2 has a larger weight average molecular weight than the other two repeating units, the chain at the farther side from the substrate, the alkylene group may much easily lie down in a parallel direction to the substrate and thus further improve durability.

For example, in the condensation polymerization product, the repeating unit represented by Chemical Formula 1-1 may have a weight average molecular weight of about 140 g/mol to about 280 g/mol, the repeating unit represented by Chemical Formula 1-2 may have a weight average molecular weight of about 159 g/mol to about 1188 g/mol, for example 330 g/mol to 1188 g/mol, and the repeating unit represented by Chemical Formula 1-3 may have a weight average molecular weight of about 28 g/mol to about 322 g/mol.

The aforementioned surface coating material may be formed into a film by a coating through a solution process or by deposition through a dry process. Accordingly, the film may be a coated film or a deposited film. According to an embodiment, a process of coating the surface coating material on a substrate, for example a glass substrate (glass plate) is provided. Herein, a primer layer may be further disposed on the glass substrate. Specifically, the coated film may be obtained by coating a solution including the surface coating material dissolved or dispersed in a solvent, for example, in a method of spin coating, slit coating, inkjet printing, or dipping and then, drying it. The deposited film may be obtained, for example, in a method of a thermal deposition, a vacuum deposition, or a chemical vapor deposition (CVD).

The film may be formed on a substrate and the substrate may be for example ceramic or a glass plate, but is not limited thereto.

Figure 5:
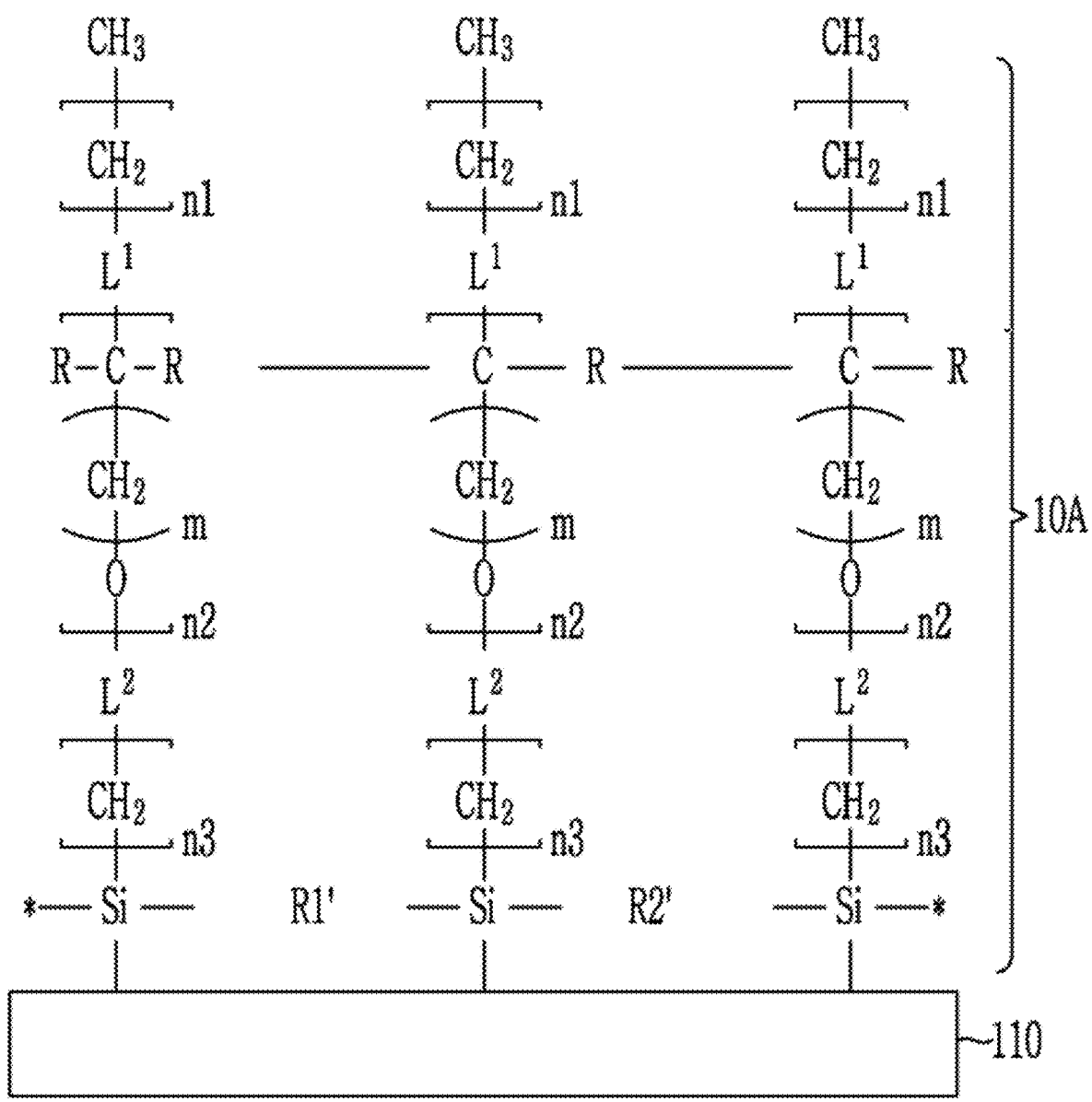
FIG. 5 is a drawing illustrating the structure of a thin film according to another embodiment coated on a substrate.

Herein, the hydrolyzable silane moiety of the compound represented by Chemical Formula 1 or a condensation polymerization product thereof may be bound at the substrate, and the alkyl group may be aligned at the surface (air). The compound represented by Chemical Formula 1 or the condensation polymerization product thereof may be aligned in a substantially perpendicular direction to the substrate. For example, in an embodiment, as depicted in FIG. 5, a functional film 10A based on the compound corresponding to Chemical Formula 1 may be bonded the substrate 110 through the silane moiety of the compound represented by Chemical Formula 1. Although not illustrated, a primer layer may be provided between the functional film 10A and the substrate 110 or, as shown in FIG. 5, the primer layer may be omitted.

The compound represented by Chemical Formula 1 or the condensation polymerization product thereof are the same as above.

The film may have a low contact angle by including the compound represented by Chemical Formula 1. Accordingly, satisfactory slipping property, fingerprint resistance, and durability may be obtained. The film may for example have a contact angle of about 60° to about 80° and within the range, for example, less than or equal to about 79°. Herein, the contact angle may be measured by using a Sessile drop technique. A liquid used for measuring the contact angle may be water and a Drop shape analyzer (DSA100, KRUSS, Germany) is used to measure the contact angle by dropping a desired (and/or alternatively predetermined) amount of water (about 3 ul) on the film.

On the other hand, the film may be measured with respect to a contact angle by using not water but diiodomethane. Herein, for example, the contact angle may be less than about 50°, for example, less than or equal to about 49°. Herein, the contact angle may be measured by using a Sessile drop technique. A liquid used for measuring the contact angle may be diiodomethane, and a Drop shape analyzer (DSA100, KRUSS, Germany) is used to measure the contact angle by dropping a desired (and/or alternatively predetermined) amount of (about 3 ul) of the diiodomethane on the surface of the film.

The substrate and the film may form a stacked structure.

The stacked structure may further include at least one layer between the substrate and the film.

The stacked structure may be a transparent film, for example a transparent flexible film.

For example, the film or the stacked structure may be attached on the display panel. Herein, the display panel and the film or the stacked structure may be directly bonded or may be bonded by interposing an adhesive. The display panel may be for example a liquid crystal panel or an organic light emitting panel, but is not limited thereto. The film or the stacked structure may be disposed on the side of an observer.

FIG. 1 is a cross-sectional view of a display device according to an embodiment.

Referring to FIG. 1, a display device 100 according to an embodiment includes a display panel 50 and a functional film 10A.

The display panel 50 may be for example an organic light emitting panel or a liquid crystal panel, for example a bendable display panel, a foldable display panel, or a rollable display panel.

The functional film 10A may include the film or stacked structure and may be disposed on the side of an observer. Another layer may be further disposed between the display panel 50 and the functional film 10A and may include for example a monolayer or plural layers of polymer layer (not shown) and optionally a transparent adhesive layer (not shown).

Figure 2:
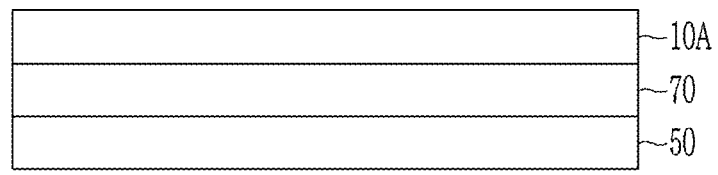
FIG. 2 is a cross-sectional view showing a display device according to another embodiment.

FIG. 2 is a cross-sectional view of a display device according to another embodiment.

Referring to FIG. 2, a display device 200 according to the present embodiment includes a display panel 50, a functional film 10A, and a touch screen panel 70 disposed between the display panel 50 and the functional film 10A.

The display panel 50 may be for example an organic light emitting panel or a liquid crystal panel, for example a bendable display panel, a foldable display panel, or a rollable display panel.

The functional film 10A may include the film or the stacked structure and may be disposed on the side of an observer.

The touch screen panel 70 may be disposed adjacent to each of the functional film 10A and the display panel 50 to recognize the touched position and the position change when is touched by a human hand or an object through the functional film 10A and then to output a touch signal. The driving module (e.g., circuit, not shown) may monitor a position where is touched from the output touch signal recognize an icon marked at the touched position, and control to carry out functions corresponding to the recognized icon, and the function performance results are displayed on the display panel 50.

Another layer may be further disposed between the touch screen panel 70 and functional film 10A and may include for example a monolayer or plural layers of polymer layer (not shown) and optionally a transparent adhesive layer (not shown).

Another layer may be further interposed between the touch screen panel 70 and the display panel 50 and may include for example a monolayer or plural layers of polymer layer (not shown) and optionally a transparent adhesive layer (not shown).

The functional film 10A including the aforementioned film or stacked structure may be applied to a variety of electronic devices such as a display device, for example a smart phone, a tablet PC, a camera, a touch screen device, and so on, but is not limited thereto.

Another embodiment provides an article manufactured by coating the aforementioned surface coating material on a substrate, for example, a glass substrate (a glass plate). Herein, the article may include a mobile display device, a monitor, a television screen, a touch screen, an auto glass, and the like but is not limited thereto.

Figure 4:
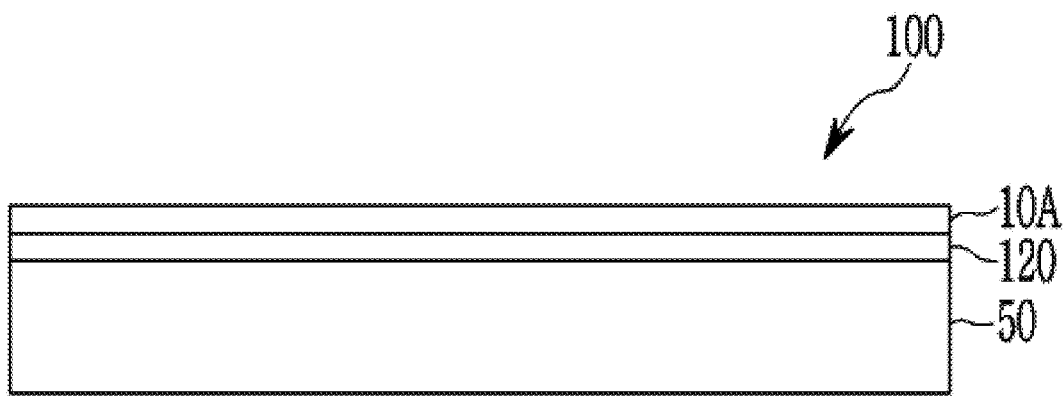
FIG. 4 is a cross-sectional view showing an article according to another embodiment.

For example, in an embodiment, as depicted in FIG. 4, an article 100 may include a substrate 110 (e.g., glass substrate) coated with a functional film 10A including the surface coating material and an optional primer layer 120 between the substrate 110 and the functional film 10A.

Hereinafter, the embodiments are illustrated in more detail with reference to examples. However, these examples are non-limiting, and the present scope is not limited thereto.

Synthesis Example: Preparation of Ternary Copolymer

The ternary copolymers according to Synthesis Examples 1 to 35 are all ternary copolymers sequentially including A1 (an alkylene group), B (a polyoxyalkylene group), and A2 (an alkylene group). In Synthesis Examples 1 to 35, n is an integer ranging from 3 to 20, and n varied with a weight average molecular weight of polyalklene glycol compound.

Synthesis Example 1

(1) 40 ml of a chloroform solution in which 4.75 g (0.01 mol) of poly(propylene glycol) acrylate and 2.02 g (0.02 mol) of triethylamine are dissolved is put in a 100 ml round-bottomed flask equipped with a dropping funnel and a magnetic stirrer at room temperature. Subsequently, 2.1876 g (0.01 mol) of lauroyl chloride is added thereto dropwise, and the mixture is reacted at room temperature for 6 hours. A reaction product therefrom is three times washed with deionized water, and an organic layer therein is dried with anhydrous magnesium sulfate (anhydrous $MgSO_4$). After evaporating the chloroform, alkyl poly(propylene glycol) acrylate (a yield: about 90%) as a binary copolymer is obtained under a reduced pressure.

(2) 0.8 g of the alkyl poly(propylene glycol) acrylate obtained in the (1) step is put in a 5 ml vial, 0.4072 g of N-(2-aminoethyl)-11-aminoundecyl trimethoxysilane is added thereto, and the mixture is reacted at 60° C. for 3 hours to prepare a ternary copolymer (a silane-terminated triblock copolymer) having a silane group at the terminal end.

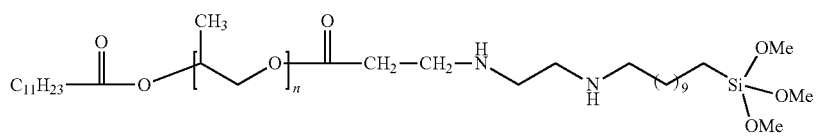

Figure 3:
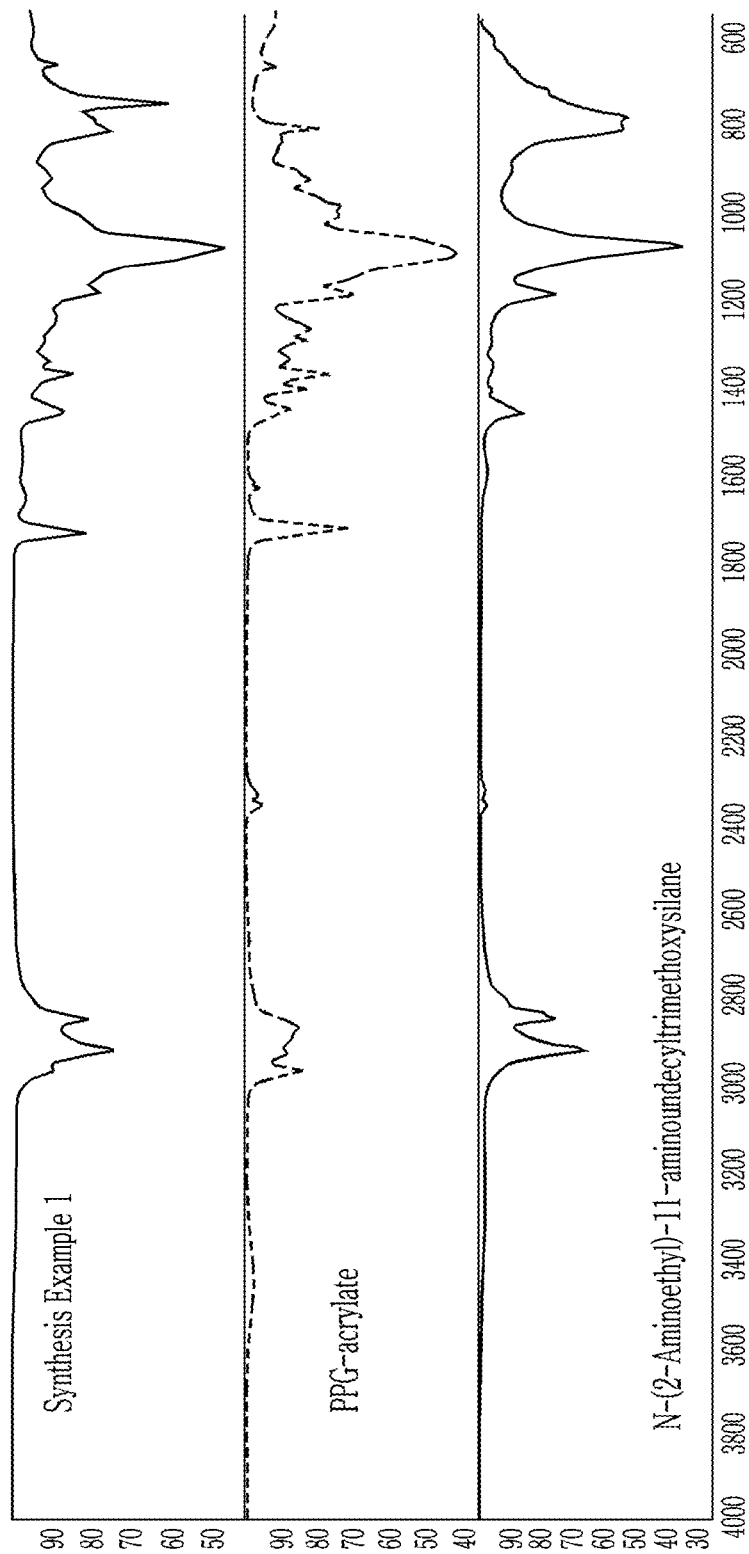
FIG. 3 is each FT-IR graph of the compound of Synthesis Example 1, polypropylene glycol-acrylate, and N-(2-aminoethyl)-11-aminoundecyl trimethoxy silane.

FIG. 3 is a FT-IR graph of the compound of Synthesis Example 1, polypropylene glycol-acrylate, and N-(2-aminoethyl)-11-aminoundecyl trimethoxy silane.

Synthesis Example 2

A synthesis is performed according to the same method as Synthesis Example 1 except that 0.3548 g of 11-aminoundecyl trimethoxysilane is used instead of 0.4072 g of the N-(2-aminoethyl)-11-aminoundecyl trimethoxysilane.

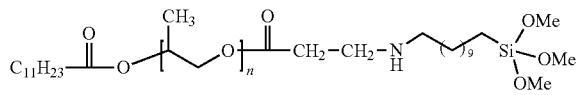

Synthesis Example 3

(1) 33.173 g (0.0415 mol) of poly(propylene glycol) diacrylate (a weight average molecular weight: 800 g/mol) is put in a 100 ml round-bottomed flask equipped with a magnetic stirrer. Subsequently, 2 g (0.0083 mol) of hexadecylamine is added thereto, and the mixture is reacted at 60° C. overnight. A reaction product therefrom is washed with hexane and extracted with acetonitrile to remove the polypropylene glycol diacrylate remaining therein. The acetonitrile extraction is twice more repeated to obtain a hexane layer, and the hexane is distilled off to obtain a binary copolymer.

(2) 0.5 g of a product obtained from the (1) step (the binary copolymer) is reacted with 0.147 g of 11-aminoundecyl trimethoxysilane at 60° C. for 3 hours to prepare a ternary copolymer including a silane group at the terminal end (a silane-terminated triblock copolymer).

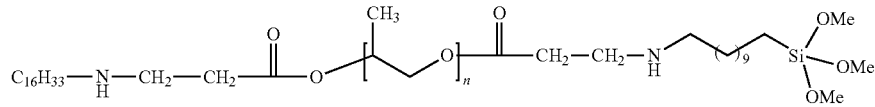

Synthesis Example 4

A synthesis is performed according to the same method as Synthesis Example 1 except that 0.3539 g of N-(6-aminohexyl)aminopropyl trimethoxysilane is used instead of 0.4072 g of the N-(2-aminoethyl)-11-aminoundecyl trimethoxysilane.

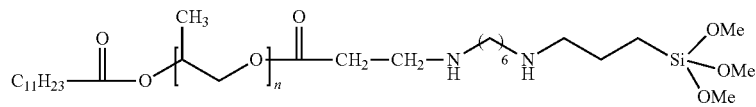

Synthesis Example 5

(1) A binary copolymer is obtained according to the same method as Synthesis Example 1 except that 3.0293 g of stearoyl chloride is used instead of 2.1876 g of the lauroyl chloride.

(2) 0.8 g of the binary copolymer obtained in the (1) step is put in a 5 ml vial, 0.361 g of N-(2-aminoethyl)-11-aminoundecyl trimethoxysilane is added thereto, and the mixture is reacted at 60° C. for 3 hours to prepare a ternary copolymer including a silane group at the terminal end (a silane-terminated triblock copolymer).

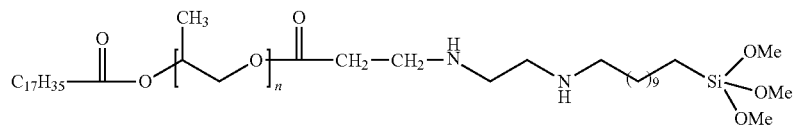

Synthesis Example 6

A synthesis is performed according to the same method as Synthesis Example 5 except that 0.301 g of N-(6-aminohexyl)aminopropyl trimethoxysilane is used instead of 0.361 g of the N-(2-aminoethyl)-11-aminoundecyl trimethoxysilane.

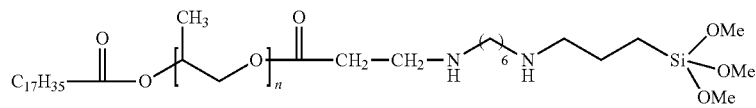

Synthesis Example 7

A synthesis is performed according to the same method as Synthesis Example 5 except that 0.3144 g of 11-aminoundecyl trimethoxysilane is used instead of 0.361 g of the N-(2-aminoethyl)-11-aminoundecyl trimethoxysilane.

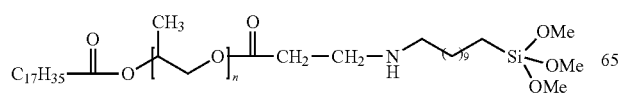

Synthesis Example 8

A synthesis is performed according to the same method as Synthesis Example 3 except that 0.1337 g of N-(6-aminohexyl)aminopropyl trimethoxysilane is used instead of 0.147 g of the 11-aminoundecyl trimethoxysilane.

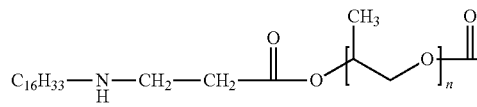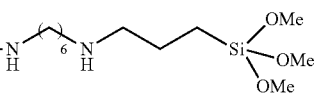

Synthesis Example 9

A synthesis is performed according to the same method as Synthesis Example 3 except that 0.1607 g of N-(2-aminoethyl)-11-aminoundecyl trimethoxysilane is used instead of 0.147 g of the 11-aminoundecyl trimethoxysilane.

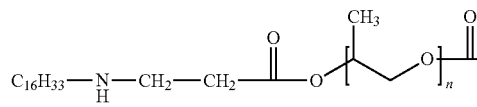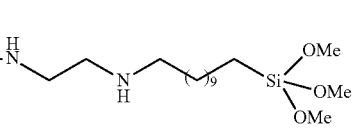

Synthesis Example 10

(1) 40 ml of a chloroform solution in which 6.6 g (0.0044 mol) of poly(propylene glycol) allyl ether (a weight average molecular weight: 1500 g/mol) and 0.809 g (0.008 mol) of triethylamine are dissolved is put in a 100 ml round-bottomed flask equipped with a dropping funnel and a magnetic stirrer at room temperature. Subsequently, 1.2117 g (0.004 mol) of stearoyl chloride solution prepared by using 10 ml of chloroform as a solvent is added thereto dropwise, and the mixture is reacted at room temperature for 6 hours. A reaction product therefrom is three times washed with deionized water, and an organic layer therein is dried with anhydrous magnesium sulfate (anhydrous MgSO$_4$). After evaporating the chloroform, a binary copolymer is obtained under a reduced pressure.

(2) 1 g of the binary copolymer obtained from the (1) step is put in a 5 ml vial, and 0.1834 g (0.0006 mol) of 11-mercaptoundecyl trimethoxysilane is added thereto. Subsequently, 0.5917 g of a solution prepared by dissolving 1 wt % of azobisisobutyronitrile (AIBN) in THF is added thereto, and the reactants are purged with nitrogen. The reaction was carried out at 70° C. overnight to prepare a ternary copolymer including a silane group at the terminal end (a silane-terminated triblock copolymer).

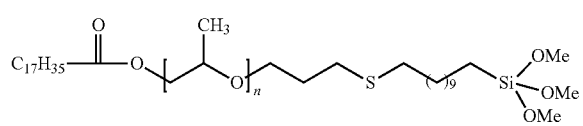

Synthesis Example 11

(1) 200 ml of a chloroform solution in which 17.6 g (0.0176 mol) of poly(propylene glycol) allyl ether (a weight average molecular weight: 1000 g/mol) and 3.24 g (0.032 mol) of triethylamine are dissolved is put in a 500 ml round-bottomed flask equipped with a dropping funnel and a magnetic stirrer at room temperature. Subsequently, 4.8468 g (0.016 mol) of a stearoyl chloride solution prepared by using 50 ml of chloroform as a solvent is added thereto dropwise, and the mixture is reacted at room temperature for 6 hours. A reaction product therefrom is three times washed with deionized water, and then, an organic layer therein is dried with anhydrous magnesium sulfate (anhydrous MgSO$_4$). After evaporating the chloroform therefrom, a binary copolymer is obtained under a reduced pressure.

(2) 1 g of the binary copolymer obtained in the (1) step is put in a 5 ml vial, and 0.2558 g (0.0008 mol) of 11-mercaptoundecyl trimethoxysilane is added thereto. Subsequently, 0.628 g of a solution prepared by dissolving 1 wt % of AIBN in THF is added thereto, and the reactants are purged with nitrogen. The reaction was carried out at 70° C. overnight to prepare a ternary copolymer having a silane group at the terminal end (a silane-terminated triblock copolymer).

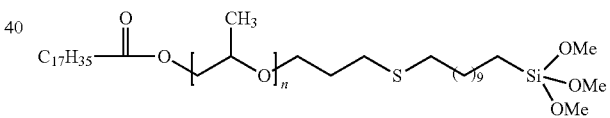

(In general structure of Synthesis Examples 11 and 12, n is different from each other. The n varies with the weight average molecular weight of poly(propylene glycol) allyl ether.)

Synthesis Example 12

A synthesis is performed according to the same method as Synthesis Example 1 except that 0.2182 g of 3-aminopropyl trimethoxysilane is used instead of 0.4072 g of the N-(2-aminoethyl)-11-aminoundecyl trimethoxysilane.

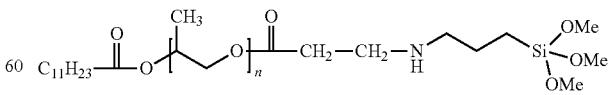

Synthesis Example 13

(1) 30 ml of a chloroform solution in which 2.6 g (0.004 mol) of polytetrahydrofuran (a weight average molecular weight: 650 g/mol) and 0.81 g (0.008 mol) of triethylamine are dissolved is put in a 100 ml round-bottomed flask equipped with a dropping funnel and a magnetic stirrer at room temperature. Subsequently, 0.875 g (0.008 mol) of lauroyl chloride is added thereto dropwise, and the mixture is reacted at room temperature for 6 hours. A reaction product therefrom is three times washed with deionized water, and an organic layer therein is dried with anhydrous magnesium sulfate (anhydrous $MgSO_4$). After evaporating the chloroform, a binary copolymer is obtained under a reduced pressure.

(2) 2.45 g of the binary copolymer obtained in the (1) step dissolved in 2 g of ethyl acetate is put in a 10 ml vial, and 0.6032 g of 3-isocyanatopropyltrimethoxysilane is added thereto. Dibutyltin dilaurate is used as a catalyst. The reactants are reacted at 60° C. for 3 hours to prepare a ternary copolymer including a silane group at the terminal end (a silane-terminated triblock copolymer).

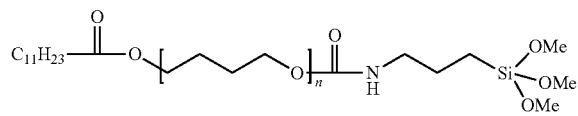

Synthesis Example 14

(1) A binary copolymer is obtained according to the same method as Synthesis Example 13 by using 1.2117 g of stearoyl chloride instead of 0.875 g of the lauroyl chloride.

(2) 2.57 g of the binary copolymer obtained in the (1) step dissolved in 2 g of ethyl acetate is put in a 10 ml vial, and 0.5767 g of 3-isocyanatopropyltrimethoxysilane is added thereto. Dibutyltin dilaurate is used as a catalyst. The reactants are reacted at 60° C. for 3 hours to prepare a ternary copolymer including a silane group at the terminal end (a silane-terminated triblock copolymer).

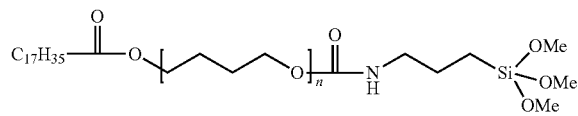

Synthesis Example 15

(1) Polyoxyethylene (10) oleyl ether (Brij O10) is used as a binary copolymer.

(2) 2 g of the binary copolymer of the (1) step dissolved in 2 g of ethyl acetate is put in a 10 ml vial, and 0.5789 g of 3-isocyanatopropyltrimethoxysilane is added thereto. Dibutyltin dilaurate is used as a catalyst. The reactants are reacted at 70° C. for 3 hours to prepare a ternary copolymer including a silane group at the terminal end (a silane-terminated triblock copolymer).

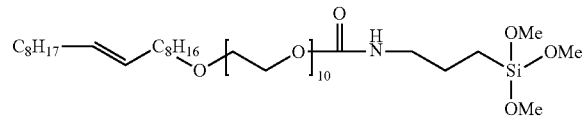

Synthesis Example 16

(1) Polyoxyethylene (10) lauryl ether (Sigma Aldrich Co., Ltd.) is used as a binary copolymer.

(2) 2 g of the binary copolymer of the (1) step dissolved in 2 g of ethyl acetate is put in a 10 ml vial, and 0.6549 g of 3-isocyanatopropyltrimethoxysilane is added thereto. Dibutyltin dilaurate is used as a catalyst. The reactants are reacted at 70° C. for 3 hours to prepare a ternary copolymer including a silane group at the terminal end (a silane-terminated triblock copolymer).

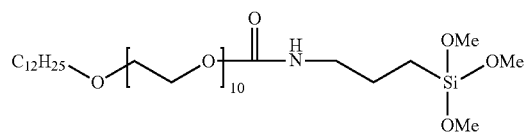

Synthesis Example 17

(1) Polyoxyethylene (10) stearyl ether (Brij S10) is used as a binary copolymer.

(2) 2 g of the binary copolymer of the (1) step dissolved in 4 g of ethyl acetate is put in a 10 ml vial, and 0.5774 g of 3-isocyanatopropyltrimethoxysilane is added thereto. Dibutyltin dilaurate is used as a catalyst. The reactants are reacted at 70° C. for 3 hours to prepare a ternary copolymer including a silane group at the terminal end (a silane-terminated triblock copolymer).

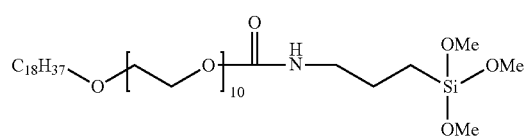

Synthesis Example 18

(1) Polyoxyethylene (10) cetyl ether (Brij C10) is used as a binary copolymer.

(2) 1.33 g of the binary copolymer of the (1) step dissolved in 4 g of ethyl acetate is put in a 10 ml vial, and 0.4 g of 3-isocyanatopropyltrimethoxysilane is added thereto. Dibutyltin dilaurate is used as a catalyst. The reactants are reacted at 70° C. for 3 hours to prepare a ternary copolymer including a silane group at the terminal end (a silane-terminated triblock copolymer).

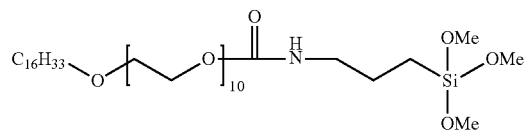

Synthesis Example 19

(1) Polyoxyethylene (4) lauryl ether (Brij L4) is used as a binary copolymer.

(2) 1 g of the binary copolymer of the (1) step dissolved in 2 g of ethyl acetate is put in a 10 ml vial, and 0.567 g of 3-isocyanatopropyltrimethoxysilane is added thereto. Dibutyltin dilaurate is used as a catalyst. The reactants are reacted at 70° C. for 3 hours to prepare a ternary copolymer including a silane group at the terminal end (a silane-terminated triblock copolymer).

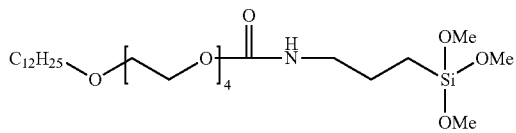

Synthesis Example 20

(1) 15 g (0.021 mol) of polyoxyethylene (10) stearyl ether and 4.26 g (0.042 mol) of triethylamine are dissolved in 200 ml of a dichloromethane solution. 3.82 g (0.042 mol) of acryloyl chloride is added thereto dropwise, while stirred, and while added, a temperature of the reactants are maintained at 0° C. to 5° C. Subsequently, after stirring the mixture in an ice bath for 1 hour, the temperature is increased up to 25° C., the reactants are treated sequentially with a 1 wt % hydrochloric acid aqueous solution (500 ml), water (500 ml), and a 1% sodium bicarbonate aqueous solution and then, dried with anhydrous magnesium sulfate (anhydrous $MgSO_4$). The dichloromethane is evaporated under a reduced pressure to obtain a binary copolymer (an off-white waxy solid).

(2) 1 g of the binary copolymer obtained in the (1), 0.4884 g of bis[3-(trimethoxysilyl)propyl]amine are mixed with a catalyst (an ionic liquid [DABCO-PDO][Ac]), 0.32 g of a 10 wt % ethanol solution) and then, reacted at 60° C. overnight.

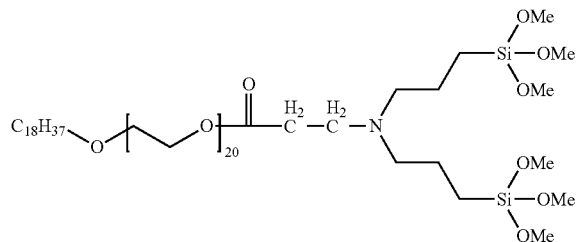

Synthesis Example 21

(1) 100 ml of a chloroform solution in which 1.44 g (0.003 mol) of poly(ethylene glycol) allyl ether (a weight average molecular weight: 480 g/mol) and 0.61 g (0.006 mol) of triethylamine are dissolved is put in a 250 ml round-bottomed flask equipped with a dropping funnel and a magnetic stirrer at room temperature. Subsequently, 0.9088 g (0.003 mol) of a stearoyl chloride solution prepared by using 50 ml of chloroform is added thereto dropwise, and the mixture is reacted at room temperature for 6 hours. A reaction product therefrom is three times washed with deionized water, and an organic layer therein is dried with anhydrous magnesium sulfate (anhydrous $MgSO_4$). After evaporating the chloroform under a reduced pressure, a binary copolymer is obtained.

(2) 1.16 g of the binary copolymer obtained in the (1) step is put in a 5 ml vial, 10 μl of a platinum (0)-1,3-divinyl-1,1,3,3-tetramethyldisiloxane complex solution in xylene and 0.285 g (0.0023 mol) of trimethoxysilane are added thereto, and the mixture is purged with nitrogen. The reaction was carried out at 70° C. overnight to prepare a ternary copolymer including a silane group at the terminal end (a silane-terminated triblock copolymer).

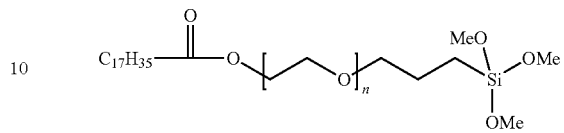

Synthesis Example 22

(1) A binary copolymer is obtained according to the same method as the (1) step of Synthesis Example 21 except that 2.25 g of poly(ethylene glycol) allyl ether (a weight average molecular weight: 750 g/mol) is used instead of 1.44 g of the poly(ethylene glycol) allyl ether (a weight average molecular weight: 480 g/mol).

(2) 1.63 g of the binary copolymer obtained in the (1) step is put in a 5 ml vial, 10 μl of a platinum (0)-1,3-divinyl-1,1,3,3-tetramethyldisiloxane complex solution in xylene and 0.294 g (0.0024 mol) of trimethoxysilane are added thereto, and the reactants are purged with nitrogen. The reaction was carried out at 70° C. overnight to prepare a ternary copolymer including a silane group at the terminal end (a silane-terminated triblock copolymer).

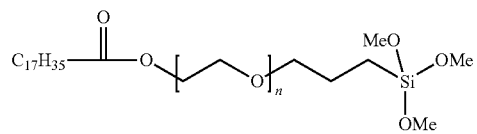

(In general structure of Synthesis Examples 21 and 22, n is different from each other. The n varies with the weight average molecular weight poly(ethylene glycol) allyl ether.)

Synthesis Example 23

10 g (0.014 mol) of polyoxyethylene (10) stearyl ether (Brij S10) dissolved in 80 ml of tetrahydrofuran and 3.15 g (0.028 mol) of potassium t-butoxide are mixed and stirred at 25° C. for 30 minutes. 5.1 g (0.042 mol) of allyl bromide is added to the mixture, and the obtained mixture is stirred again at 100° C. for 5 hours. When a reaction is complete, the temperature is decreased down to 25° C., and then, the tetrahydrofuran is evaporated under a reduced pressure. Undissolved materials remaining after treating residues with 100 ml of hot toluene are filtered and removed. The toluene is evaporated under a reduced pressure, and non-reacted allyl bromide is removed. The remaining materials (oily residues) are dissolved in 300 ml of ethyl acetate and then, three times washed with 200 ml of water. An organic layer therein is dried with anhydrous magnesium sulfate (anhydrous $MgSO_4$), and the ethyl acetate is evaporated under a reduced pressure to obtain 9.9 g of a light yellow oily binary copolymer.

(2) 5 g of binary copolymer obtained in the (1) step is added to 10 μl of a platinum (0)-1,3-divinyl-1,1,3,3-tetramethyldisiloxane complex solution in xylene and 1.222 g (0.01 mol) of trimethoxysilane, and the reactants are purged with nitrogen. The reaction was carried out at 70° C. overnight to obtain a ternary copolymer including a silane group at the terminal end (a silane-terminated triblock copolymer).

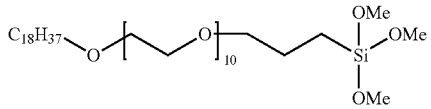

Synthesis Example 24

(1) 10 g (0.0087 mol) of polyoxyethylene (20) stearyl ether (Brij S20) dissolved in 50 ml of tetrahydrofuran and 1.95 g (0.017 mol) of potassium t-butoxide are mixed and stirred at 25° C. for 30 minutes. 2.02 g (0.0087 mol) of 11-bromo-1-undecene is added to the mixture, and the obtained mixture is stirred again at 100° C. for 48 hours. When a reaction is complete, the temperature is decreased down to 25° C., and a 1 wt % hydrochloric acid aqueous solution is added thereto to adjust pH into 1 or so. Then, the tetrahydrofuran is evaporated under a reduced pressure. 250 ml of dichloromethane is used to dissolve residues thereof, and the solution is twice washed with 250 ml of water and 250 ml of a sodium bicarbonate aqueous solution. The dichloromethane is evaporated under a reduced pressure. 200 ml of methanol is used to dissolve the residues, and the solution is treated with charcoal and then, filtered. After evaporating the methanol under a reduced pressure, residues thereof is dissolved in 150 ml of toluene. The toluene is evaporated at 90° C. under a reduced pressure, which is twice repeated. Nitrogen gas is discharged thereinto at 90° C. for 1 hour to remove toluene residues and obtain a binary copolymer.

(2) 1 g of the binary copolymer obtained in the (1) step is put in a 5 ml vial, and 0.2468 g (0.0008 mol) of 11-mercaptoundecyl trimethoxysilane is added thereto. Subsequently, 0.6234 g of a solution prepared by dissolving 1 wt % of AIBN in THF is added thereto, and the reactants are purged with nitrogen. The reaction was carried out at 70° C. overnight to prepare a ternary copolymer including a silane group at the terminal end (a silane-terminated triblock copolymer).

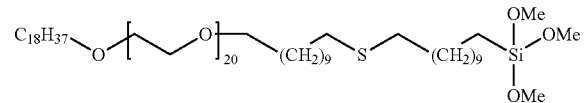

Synthesis Example 25

10.67 g (0.015 mol) of polyoxyethylene (10) stearyl ether (Brij S10) dissolved in 100 ml of tetrahydrofuran and 3.36 g (0.03 mol) of potassium t-butoxide are mixed and stirred at 25° C. for 30 minutes. 3.5 g (0.015 mol) of 11-bromo-1-undecene is added thereto, and the obtained mixture is stirred again at 100° C. for 48 hours. When a reaction is complete, the temperature is decreased down to 25° C., and a 1 wt % hydrochloric acid aqueous solution is added thereto to adjust pH into 1 or so. Subsequently, the tetrahydrofuran is evaporated under a reduced pressure. After dissolving residues thereof in 250 ml of dichloromethane, the solution is twice washed with 250 ml of water and 250 ml of a sodium bicarbonate aqueous solution. The dichloromethane is evaporated under a reduced pressure. 200 ml of methanol is used to dissolve residues thereof, and the solution is treated with charcoal and then, filtered. The methanol is evaporated under a reduced pressure, and residues thereof are dissolved in 150 ml of toluene. The toluene is evaporated at 90° C. under a reduced pressure, which is twice repeated. Nitrogen gas is discharged thereinto at 90° C. for 1 hour to remove the residual toluene and obtain a binary copolymer as a white waxy solid.

1 g of the binary copolymer obtained in the 1 is put in a 5 ml vial, and 0.3752 g (0.0012 mol) of 11-mercaptoundecyl trimethoxysilane is added thereto. Subsequently, 0.6876 g of a solution prepared by dissolving 1 wt % of AIBN in THF is added thereto, and the reactants are purged with nitrogen. The reaction was carried out at 70° C. to obtain a ternary copolymer including a silane group at the terminal end (a silane-terminated triblock copolymer).

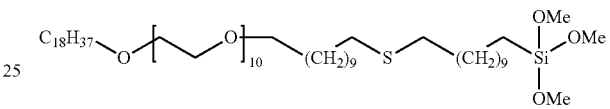

Synthesis Example 26

4.53 g of the binary copolymer according to the (1) step of Synthesis Example 20 is put in a 20 ml vial, and 1.98 g (0.0059 mol) of N-(2-aminoethyl)-11-aminoundecyl trimethoxysilane is added thereto. The mixture is stirred at 60° C. for 15 hours to obtain a ternary copolymer (a light-yellow waxy solid).

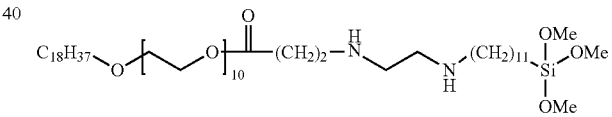

Synthesis Example 27

(1) 10 g (0.0087 mol) of polyoxyethylene (20) stearyl ether and 1.75 g (0.0174 mol) of triethylamine are dissolved in 100 ml of a dichloromethane solution. 1.57 g (0.0174 mol) of acryloyl chloride is added thereto in a dropwise fashion, while stirred, and while added, the reactants are maintained at 0° C. to 5° C. Subsequently, the mixture is stirred on an ice bath at 0° C. for one hour, heated up to 25° C., sequentially treated with a 1 wt % hydrochloric acid aqueous solution (500 ml), water (500 ml), and a 1% sodium bicarbonate aqueous solution, and dried with anhydrous magnesium sulfate (anhydrous MgSO$_4$). The dichloromethane is evaporated under a reduced pressure to obtain a binary copolymer (an off-white waxy solid).

0.761 g of the binary copolymer obtained in the (1) step is put in a 5 ml vial, and 0.211 g (0.0063 mol) of N-(2-aminoethyl)-11-aminoundecyl trimethoxysilane is added thereto. The mixture is stirred at 60° C. for 15 hours to obtain a ternary copolymer (a light-yellow waxy solid).

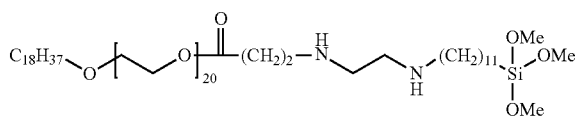

Synthesis Example 28

1 g of the binary copolymer obtained in the (1) step of Synthesis Example 25 is added to 10 μl of a platinum (0)-1,3-divinyl-1,1,3,3-tetramethyldisiloxane complex solution in xylene and 0.2123 g (0.00116 mol) of trimethoxysilane, and the mixture is purged with nitrogen. The reaction was carried out at 60° C. overnight to obtain a ternary copolymer including a silane group at the terminal end (a silane-terminated triblock copolymer).

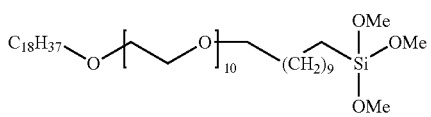

Synthesis Example 29

(1) 30 ml of a chloroform solution in which 2 g (0.0032 mol) of polyoxyethylene (10) lauryl ether and 0.646 g (0.0064 mol) of triethylamine are dissolved is put in a 250 ml round-bottomed flask equipped with a dropping funnel and a magnetic stirrer at room temperature. Subsequently, 0.6468 g (0.0032 mol) of undecenoyl chloride is added thereto dropwise, and the mixture is reacted at room temperature for 6 hours. A reaction product therefrom is three times washed with deionized water, and an organic layer therein is dried with anhydrous magnesium sulfate (anhydrous MgSO₄). The chloroform is evaporated under reduced pressure to obtain a binary copolymer.

1.4589 g of the binary copolymer obtained in the (1) step is put in a 5 ml vial, 10 μl of a platinum (0)-1,3-divinyl-1,1,3,3-tetramethyldisiloxane complex solution in xylene and 0.3372 g (0.00276 mol) of trimethoxysilane are added thereto, and the mixture is purged with nitrogen. The reaction was carried out at 70° C. overnight to prepare a ternary copolymer including a silane group at the terminal end (a silane-terminated triblock copolymer).

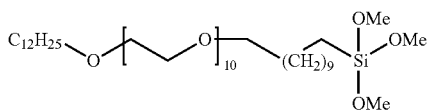

Synthesis Example 30

(1) 40.5 g (0.0646 mol) of polyoxyethylene (10) lauryl ether and 9.14 g (0.0905 mol) of triethylamine are dissolved in 500 ml of a dichloromethane solution. 7.01 g (0.0775 mol) of acryloyl chloride is added thereto dropwise, while stirred, and while added, the reactants are maintained at 0° C. to 5° C. Subsequently, the mixture is stirred on an ice bath for 1 hour, heated up to 25° C., treated (washed) sequentially with a 1 wt % hydrochloric acid aqueous solution (500 ml), water (500 ml), and an 1% sodium bicarbonate aqueous solution, and dried with anhydrous magnesium sulfate (anhydrous MgSO₄). The dichloromethane is evaporated under reduced pressure to obtain a binary copolymer (an off-white waxy solid).

(2) 1 g of the binary copolymer obtained in the (1) step is put in a 5 ml vial, and 0.4914 g (0.00147 mol) of N-(2-aminoethyl)-11-aminoundecyl trimethoxysilane is added thereto. The mixture is stirred at 60° C. for 3 hours to obtain a ternary copolymer.

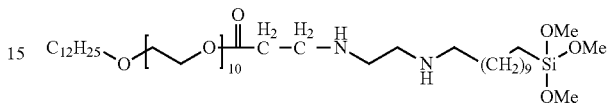

Synthesis Example 31

1 g of the binary copolymer obtained in the (1) step of Synthesis Example 25 is put in a 5 ml vial, and 0.4091 g (0.00147 mol) of N-(6-aminohexyl)-3-aminopropyl trimethoxysilane is added thereto. The mixture is stirred at 60° C. for 3 hours to obtain a ternary copolymer.

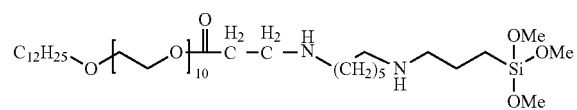

Synthesis Example 32

0.2 g of the binary copolymer obtained in the (1) step of Synthesis Example 25 is put in a 1 ml vial, and 0.0856 g (0.00029 mol) of 11-aminoundecyl trimethoxysilane is added thereto. The mixture is stirred at 60° C. for 3 hours to obtain a ternary copolymer.

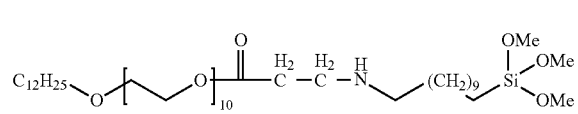

Synthesis Example 33

20 ml of a chloroform solution in which 2 g (0.008 mol) of poly(ethylene glycol) allyl ether (a weight average molecular weight: 250 g/mol) and 1.619 g (0.016 mol) of triethylamine are dissolved is put in a 50 ml round-bottomed flask equipped with a dropping funnel and a magnetic stirrer at room temperature. Subsequently, 1.75 g (0.008 mol) of lauroyl chloride is added thereto dropwise, and the mixture is reacted at room temperature for 6 hours. A reaction product therefrom is three times washed with deionized water, and an organic layer therein is dried with anhydrous magnesium sulfate (anhydrous MgSO₄). The chloroform is evaporated under reduced pressure to obtain a binary copolymer.

1 g of the binary copolymer obtained in the (1) step is put in a 5 ml vial, and 0.785 g (0.0025 mol) of 11-mercaptoundecyl trimethoxysilane is added thereto. Subsequently, 0.89 g of a solution prepared by dissolving 1 wt % of AIBN in THF is added thereto, and the reactants are purged with nitrogen. The reaction was carried out at 70° C. overnight to prepare a ternary copolymer including a silane group at the terminal end (a silane-terminated triblock copolymer).

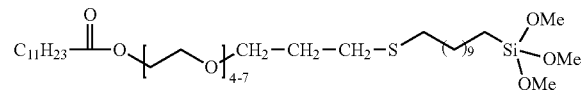

Synthesis Example 34

The binary copolymer is obtained according to the same method as Synthesis Example 33 except that 2.423 g of stearoyl chloride is used instead of 1.75 g of the lauroyl chloride.

1 g of the binary copolymer obtained in the (1) step is put in a 5 ml vial, and 0.6109 g (0.0018 mol) of 11-mercaptoundecyl trimethoxysilane is added thereto. Subsequently, 0.8 g of a solution prepared by dissolving 1 wt % of AIBN in THF is added thereto, and the reactants are purged with nitrogen. The reaction was carried out at 70° C. overnight to prepare a ternary copolymer including a silane group at the terminal end (a silane-terminated triblock copolymer).

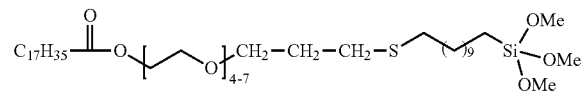

Synthesis Example 35

1 g of the binary copolymer obtained in the (1) step of Synthesis Example 23 is put in a 5 ml vial, and 0.4109 g (0.0013 mol) of 11-mercaptoundecyl trimethoxysilane is added thereto. Subsequently, 0.7 g of a solution prepared by dissolving 1 wt % of AIBN in THF is added thereto, and the reactants are purged with nitrogen. The reaction was carried out at 70° C. overnight to prepare a ternary copolymer including a silane group at the terminal end (a silane-terminated triblock copolymer).

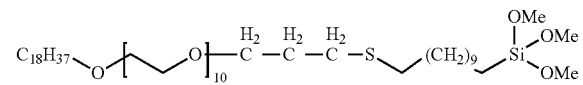

Comparative Synthesis Example

Both the binary copolymers according to Comparative Synthesis Examples 1 and 3 sequentially include B (a polyoxyalkylene group) and A2 (an alkylene group).

Comparative Synthesis Example 1

Commercially-available 11-(2-methoxyethoxy)undecyl trimethoxysilane (Gelest, Inc.) is used.

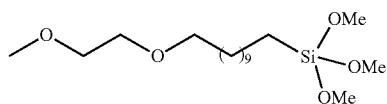

Comparative Synthesis Example 2

Commercially-available perfluoropolyether silane OPTOOL UD509 (Daikin LLC.) is used.

Comparative Synthesis Example 3

Preparation of Binary Copolymer 200 ml of a chloroform solution in which 15 g (0.025 mol) of O-(2-aminopropyl)-O'-(2-methoxyethyl)propylene glycol (a weight average molecular weight: 600 g/mol) and 4.0476 g (0.04 mol) of triethylamine are dissolved is put in a 500 ml round-bottomed flask equipped with a dropping funnel and a magnetic stirrer at room temperature. Subsequently, the mixture is moved to an ice bath, 5.068 g (0.025 mol) of 10-undecenoyl chloride is added thereto dropwise, and the reactants are reacted at room temperature for 3 hours. A reaction product therefrom is three times washed with deionized water, and an organic layer therein is dried with anhydrous magnesium sulfate (anhydrous MgSO$_4$). The chloroform is evaporated under a reduced pressure to obtain a binary copolymer.

1 g of the binary copolymer obtained in the (1) step is put in a 5 ml vial, 10 μl of a platinum (0)-1,3-divinyl-1,1,3,3-tetramethyldisiloxane complex solution in xylene and 0.2407 g (0.00197 mol) of trimethoxysilane are added thereto, and the mixture is purged with nitrogen. The reaction was carried out at 70° C. overnight to prepare a binary copolymer including a silane group at the terminal end (a silane-terminated diblock copolymer).

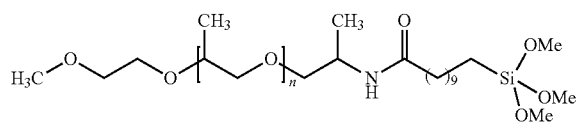

(n varied with a weight average molecular weight of O-(2-aminopropyl)-O'-(2-methoxyethyl)propylene glycol.)

EXAMPLE AND COMPARATIVE EXAMPLE

Each copolymer of Synthesis Examples and Comparative Synthesis Examples is coated on a glass plate through an electron beam vacuum deposition. Specifically, the copolymers obtained in Synthesis Examples and Comparative Synthesis Examples are respectively put at a concentration of 50 to 70 wt % in an ethyl acetate or tetrahydrofuran solvent and then, mixed therewith to prepare compositions. Subsequently, the compositions are electron beam-vacuum deposited on a glass substrate to form 100 to 600 Å-thick films. Each weight average molecular weight of repeating units (A1, B, A2) in the copolymers respectively used in Examples and Comparative Examples is shown in Table 1.

TABLE 1

| | Binary copolymer or ternary copolymer | Weight average molecular weight (g/mol) of repeating units of copolymers | | |
|---|---|---|---|---|
| | | A1 (alkylene group) | B (polyoxyalkylene group) | A2 (alkylene group) |
| Example 1 | Synthesis Example 1 | 150 | 350 | 180 |
| Example 2 | Synthesis Example 2 | 150 | 350 | 150 |
| Example 3 | Synthesis Example 3 | 220 | 700 | 150 |
| Example 4 | Synthesis Example 4 | 150 | 350 | 126 |
| Example 5 | Synthesis Example 5 | 239 | 357 | 180 |
| Example 6 | Synthesis Example 6 | 239 | 357 | 126 |
| Example 7 | Synthesis Example 7 | 239 | 357 | 150 |
| Example 8 | Synthesis Example 8 | 225 | 638 | 126 |
| Example 9 | Synthesis Example 9 | 225 | 638 | 182 |
| Example 10 | Synthesis Example 10 | 239 | 1142 | 196 |
| Example 11 | Synthesis Example 11 | 239 | 942 | 196 |
| Example 12 | Synthesis Example 12 | 155 | 387 | 42 |
| Example 13 | Synthesis Example 13 | 155 | 650 | 42 |
| Example 14 | Synthesis Example 14 | 239 | 650 | 42 |
| Example 15 | Synthesis Example 15 | 251 | 440 | 42 |
| Example 16 | Synthesis Example 16 | 169 | 440 | 42 |
| Example 17 | Synthesis Example 17 | 253 | 440 | 42 |
| Example 18 | Synthesis Example 18 | 225 | 440 | 42 |
| Example 19 | Synthesis Example 19 | 169 | 176 | 42 |
| Example 20 | Synthesis Example 20 | 253 | 440 | 42 |
| Example 21 | Synthesis Example 21 | 253 | 422 | 42 |
| Example 22 | Synthesis Example 22 | 253 | 692 | 42 |
| Example 23 | Synthesis Example 23 | 253 | 440 | 42 |
| Example 24 | Synthesis Example 24 | 253 | 880 | 300 |
| Example 25 | Synthesis Example 25 | 253 | 440 | 300 |
| Example 26 | Synthesis Example 26 | 253 | 440 | 180 |
| Example 27 | Synthesis Example 27 | 253 | 880 | 180 |
| Example 28 | Synthesis Example 28 | 253 | 440 | 150 |
| Example 29 | Synthesis Example 29 | 169 | 440 | 140 |
| Example 30 | Synthesis Example 30 | 169 | 440 | 182 |
| Example 31 | Synthesis Example 31 | 169 | 440 | 126 |
| Example 32 | Synthesis Example 32 | 169 | 440 | 150 |
| Example 33 | Synthesis Example 33 | 150 | 282 | 150 |
| Example 34 | Synthesis Example 34 | 239 | 282 | 150 |
| Example 35 | Synthesis Example 35 | 253 | 440 | 196 |
| Comparative Example 1 | Comparative Synthesis Example 1 | — | 75 | 150 |
| Comparative Example 2 | Comparative Synthesis Example 2 | 4000 (perfluoro-based silane compounds, which do not include A1, B, and A2 repeating units) | | |
| Comparative Example 3 | Comparative Synthesis Example 3 | — | 600 | 140 |

Evaluation 1

Durability of the films of Examples 1 to 35 and Comparative Examples 1 to 3 is evaluated.

The durability of the films is evaluated by measuring a contact angle.

The contact angle is evaluated by a Sessile drop technique method and specifically measured by respectively dropping water and diiodomethane on each film and using a drop shape analyzer (DSA100, KRUSS, Germany).

A friction coefficient is measured by using a FPT-F1 tester (Labthink Instruments Co., Ltd.).

The contact angle and friction coefficient results are shown in Table 2.

TABLE 2

| | Contact angle (°) (water) | Contact angle (°) (diiodomethane) | Friction coefficient |
|---|---|---|---|
| Example 1 | 77 | 43 | 0.43 |
| Example 2 | 79 | 35 | 0.3 |
| Example 3 | 77 | 36 | 0.22 |
| Example 4 | 73 | 43 | 0.37 |
| Example 5 | 77 | 44 | 0.38 |
| Example 6 | 78 | 47 | 0.47 |
| Example 7 | 77 | 46 | 0.45 |
| Example 8 | 73 | 39 | 0.34 |
| Example 9 | 60 | 47 | 0.38 |
| Example 10 | 69 | 45 | 0.29 |
| Example 11 | 71 | 45 | 0.24 |
| Example 12 | 76 | 45 | 0.38 |
| Example 13 | 68 | 37 | 0.44 |
| Example 14 | 75 | 45 | 0.47 |
| Example 15 | 64 | 42 | 0.45 |
| Example 16 | 69 | 48 | 0.31 |
| Example 17 | 67 | 44 | 0.28 |
| Example 18 | 61 | 45 | 0.34 |
| Example 19 | 78 | 48 | 0.45 |
| Example 20 | 74 | 41 | 0.36 |
| Example 21 | 72 | 44 | 0.26 |
| Example 22 | 61 | 40 | 0.25 |
| Example 23 | 73 | 49 | 0.33 |
| Example 24 | 67 | 45 | 0.27 |
| Example 25 | 78 | 49 | 0.26 |
| Example 26 | 74 | 45 | 0.38 |
| Example 27 | 65 | 43 | 0.38 |
| Example 28 | 74 | 46 | 0.31 |
| Example 29 | 67 | 44 | 0.47 |
| Example 30 | 66 | 40 | 0.31 |
| Example 31 | 61 | 42 | 0.27 |
| Example 32 | 61 | 43 | 0.36 |
| Example 33 | 75 | 41 | 0.22 |
| Example 34 | 78 | 47 | 0.27 |
| Example 35 | 68 | 47 | 0.20 |
| Comparative Example 1 | 70 | 40 | 1.00 |

TABLE 2-continued

| | Contact angle (°) (water) | Contact angle (°) (diiodomethane) | Friction coefficient |
|---|---|---|---|
| Comparative Example 2 | 118 | 98 | 0.10 |
| Comparative Example 3 | 60 | 42 | 0.50 |

Referring to Tables 1 and 2, the binary copolymer of Comparative Example 1 has a high friction coefficient and thus shows deteriorated durability compared with the ternary copolymers of Examples 1 to 35. In addition, even though the binary copolymer of Comparative Example 3 has a weight average molecular weight satisfying a particular range, still durability is deteriorated compared with the ternary copolymer. Furthermore, referring to Comparative Example 2, when a perfluoro-based copolymer is used alone, a friction coefficient is decreased, but a contact angle thereof is increased as much and thus causes a fingerprint smudge phenomenon, and accordingly, a diffused reflection may easily occur.

Evaluation 2

Wear resistances of the films of Example 1 and Comparative Examples 1 to Comparative Example 3 are evaluated. The wear resistance evaluation is performed by measuring the number of rubbing until the films are eased off by using a 6 mm-wide polyurethane rubber eraser having a load of 1 kg. The wear resistance evaluation results are shown in Table 3.

TABLE 3

| | Example 1 | Comparative Example 1 | Comparative Example 2 | Comparative Example 3 |
|---|---|---|---|---|
| The number of Rubbing (times) | 10000 | 1500 | 8000 | 3000 |

Referring to Table 3, the film of Example 1 shows excellent wear resistance compared with the films of Comparative Examples 1 to 3.

FIG. 5 is a drawing illustrating the structure of a thin film according to another embodiment coated on a substrate.

While this disclosure has been described in connection with what is presently considered to be practical example embodiments, it is to be understood that inventive concepts are not limited to the disclosed embodiments. On the contrary, inventive concepts cover various modifications and equivalent arrangements included within the spirit and scope of the appended claims.

What is claimed is:

1. A surface coating material comprising:
a compound represented by Chemical Formula 1,

[Chemical Formula 1]

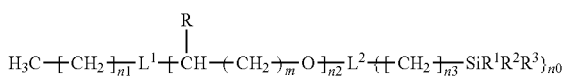

wherein, in Chemical Formula 1,
$R^1$ to $R^3$ are independently hydrogen, halogen, hydroxyl group, or a substituted or unsubstituted C1 to C20 alkoxy group, R is a substituted or unsubstituted C1 to C20 alkyl group,
$L^1$ is a single bond, *—O—*, *—C(=O)O—*, *—NH—(CH2)p1-C(=O)O—*, *S—(CH2)p2-, or —*S—(CH2)p2-O—*,
$L^2$ is a single bond, a substituted or unsubstituted C1 to C20 alkylene group, *—C(=O)—*, *—C(=O)NH—*, *—C(=O)(CH2)p3NH—*, *—NHC(=O)NH—*, *—C(=O)(CH2)$_{p4}$NH(CH2)p5NH—*, *—(CH2)p6S—*, or

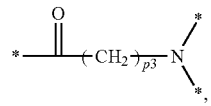

p1 to p6 are independently integers ranging from 1 to 20,
n0 is an integer of 1 or 2,
n1 is an integer ranging from 10 to 20,
n2 is an integer ranging from, 3 to 20, and
n3 is an integer ranging from 9 to 23, and
m is an integer of 1;
wherein the compound represented by Chemical Formula 1 includes a repeating unit corresponding to Chemical Formula 1-1, a repeating unit corresponding to Chemical Formula 1-2, and a repeating unit corresponding to Chemical Formula 1-3,

[Chemical Formula 1-1]

[Chemical Formula 1-2]

[Chemical Formula 1-3]

and
wherein a weight average molecular weight of the repeating unit represented by Chemical Formula 1-1 is about 140 g/mol to about 280 g/mol,
a weight average molecular weight of the repeating unit represented by Chemical Formula 1-2 is about 350 g/mol to about 1188 g/mol, and
a weight average molecular weight of the repeating unit represented by Chemical Formula 1-3 is about 126 g/mol to about 322 g/mol.

2. An article comprising: a glass substrate coated with the surface coating material of claim 1.

3. A film comprising:
a condensation polymerization product of a compound represented by Chemical Formula 1,

[Chemical Formula 1]

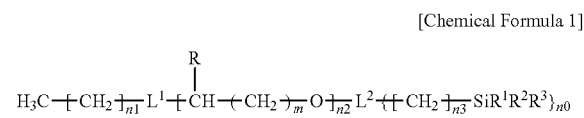

wherein, in Chemical Formula 1,
$R^1$ to $R^3$ are independently hydrogen, halogen, hydroxyl group, or a substituted or unsubstituted C1 to C20 alkoxy group, R is a substituted or unsubstituted C1 to C20 alkyl group,
$L^1$ is a single bond, *—O—*, *—C(=O)O—*, *—NH—$(CH_2)_{p1}$—C(=O)O—*, *S—$(CH_2)_{p2}$—*, or *—*S—$(CH_2)_{p2}$—O—*,
$L^2$ is a single bond, a substituted or unsubstituted C1 to C20 alkylene group, *—C(=O)—*, *—C(=O)NH—*, *—C(=O)$(CH_2)_{p3}$NH—*, *—NHC(=O)NH—*, *—C(=O)$(CH_2)_{p4}$NH$(CH_2)$p_5NH—*, *—$(CH_2)_{p6}$S—*, or

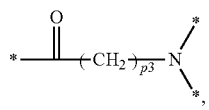

p1 to p6 are independently integers ranging from 1 to 20,
n0 is an integer of 1 or 2,
n1 is an integer ranging from 10 to 20,
n2 is an integer ranging from 3 to 20, and
n3 is an integer ranging from 9 to 23, and
m is an integer of 1;
wherein the compound represented by Chemical Formula 1 includes a repeating unit corresponding to Chemical Formula 1-1, a repeating unit corresponding to Chemical Formula 1-2, and a repeating unit corresponding to Chemical Formula 1-3,

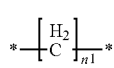

[Chemical Formula 1-1]

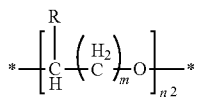

[Chemical Formula 1-2]

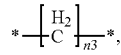

[Chemical Formula 1-3]

and
wherein a weight average molecular weight of the repeating unit represented by Chemical Formula 1-1 is about 140 g/mol to about 280 g/mol,
a weight average molecular weight of the repeating unit represented by Chemical Formula 1-2 is about 350 g/mol to about 1188 g/mol, and
a weight average molecular weight of the repeating unit represented by Chemical Formula 1-3 is about 126 g/mol to about 322 g/mol.

4. The film of claim 3, wherein the film is a coated film or a deposited film.

5. The film of claim 3, wherein the film has a water contact angle of about 60° to about 80° and an oil contact angle of less than about 50°.

6. A stacked structure, comprising
a substrate, and
the film of claim 3.

7. A display device comprising the stacked structure of claim 6.

8. A display device comprising the film of claim 3.

* * * * *